US007685831B2

(12) United States Patent
Oh

(10) Patent No.: US 7,685,831 B2
(45) Date of Patent: Mar. 30, 2010

(54) COMMUNICATION PAD MOUNTING STRUCTURE OF REFRIGERATOR

(75) Inventor: Seung Jin Oh, Daegu (KR)

(73) Assignee: LG Electronics Inc., Seoul (KR)

( * ) Notice: Subject to any disclaimer, the term of this patent is extended or adjusted under 35 U.S.C. 154(b) by 791 days.

(21) Appl. No.: 10/582,619

(22) PCT Filed: Mar. 19, 2004

(86) PCT No.: PCT/KR2004/000608

§ 371 (c)(1),
(2), (4) Date: Jun. 12, 2006

(87) PCT Pub. No.: WO2005/057105

PCT Pub. Date: Jun. 23, 2005

(65) Prior Publication Data

US 2007/0126413 A1 Jun. 7, 2007

(30) Foreign Application Priority Data

Dec. 15, 2003 (KR) ..................... 10-2003-0091588

(51) Int. Cl.
*F25D 23/12* (2006.01)

(52) U.S. Cl. .......................... 62/259.2; 62/331; 348/61; 348/739; 348/836

(58) Field of Classification Search ............. 324/158.1; 62/259.2, 125–131, 331; 361/680, 681; 348/61, 348/739, 836
See application file for complete search history.

(56) References Cited

U.S. PATENT DOCUMENTS 5,321,579 A * 6/1994 Brown et al. ........... 361/679.06
6,682,161 B2 * 1/2004 Yun ........................... 312/405
2001/0052741 A1 * 12/2001 Yun ........................... 312/405

FOREIGN PATENT DOCUMENTS

| | | |
|---|---|---|
| JP | 2001-324258 | 11/2001 |
| JP | 2002-243354 | 8/2002 |
| KR | 2001-113400 | 12/2001 |
| KR | 2002-29506 | 4/2002 |
| KR | 2002-57634 | 7/2002 |

* cited by examiner

*Primary Examiner*—William E Tapolcai
(74) *Attorney, Agent, or Firm*—Ked & Associates LLP

(57) ABSTRACT

There is a problem in that it is inconvenient to use a conventional communication pad since a user cannot diversely adjust a direction of the communication pad. The present invention relates to a communication pad mounting structure of a refrigerator. In the present invention, a front of a door of a refrigerator is formed with a seating space. The upper and lower portions of the seating space are formed with slots elongated from side to side, respectively. The holder for supporting a communication pad is mounted in the seating space tiltably from side to side. To this end, there are provided a pair of links, wherein an end of the links is connected to the slot to pivot and move along each slot, and the other end of each of the links is pivotably connected to a side of each of the upper and lower surfaces of the holder. According to the present invention with such a structure, the communication pad which is supported by the holder can be tilted to a desired position according to a position of the user.

17 Claims, 6 Drawing Sheets

COMMUNICATION PAD MOUNTING STRUCTURE OF REFRIGERATOR

TECHNICAL FIELD

The present invention relates to a refrigerator, and more particularly, to a communication pad mounting structure of a refrigerator for mounting a communication pad tiltably from side to side.

BACKGROUND ART

FIG. 1 shows an appearance of a refrigerator according to a prior art. According to the figure, doors 11 and 13 are installed at a main body 10 of the refrigerator. The doors 11 and 13, which are for selectively opening and closing a predetermined storage space provided in the main body 10, are pivotably installed at the main body 10 through hinges h and h', respectively. Door handles 11' and 13' are installed at sides opposite to pivots of the doors 11 and 13, respectively.

While a dispenser for supplying water to the outside is installed at the door 11 of the doors 11 and 13, a communication pad 17 is installed at the door 13. Alternatively, a home bar may be naturally installed at any one of the doors.

The communication pad 17 for communication between a user and the refrigerator comprises a separate household electrical appliance, such as a LCD screen, a tabulate computer, a television, a radio. The communication pad 17 is connected to a controller 19 provided on an upper portion of the main body 10 by wire or wireless.

In addition, FIG. 2 shows a communication pad mounting structure according to the prior art. According to the figure, a front surface of the door 13 of the refrigerator is provided with a seating space 14 for seating the communication pad 17. A front surface of the seating space 14 is formed to be open. A bottom surface of the seating surface 14 is formed with a pair of through holes 14*a*. In addition, upper and lower ends of the seating space 14 are provided with a clamp 20 and a holder 30 for fixing the communication pad 17, respectively.

The clamp 20 is formed with a seating groove 21, which is elongated from side to side, and in which an upper end of the communication pad 17 is seated. A front end of the clamp 20 is formed with a supporting end 23 for supporting an upper front end of the communication pad 17. The clamp 20 is pivotably installed by a hinge 25, which is provided at the upper end of the seating space 14.

The hinge 25 is provided with at least one torsion spring 29. The torsion spring 29 prevents the clamp 20 from freely pivoting and maintains the state that the communication pad 17 is seated in the seating space 14. The torsion spring 29 gives the clamp 20 an elastic force counterclockwise with respect to the figure.

In the meantime, the holder 30 is formed with an insertion groove 31, which is elongated from side to side, and into which a lower end of the communication pad 17 is inserted. A bottom surface of the holder 30 is provided with insertion legs 33, which pass through the through holes 14*a* and are positioned at the lower end of the seating space 14. The insertion legs 33 may slightly move back and forth in the through holes 14*a*. Lower ends of insertion legs 33 are slightly projected perpendicularly to its lengthwise direction, and therefore, have a width larger than the through holes 14*a*, respectively. Thus, the holder 30 is prevented from being accidentally detached out of the seating space 14.

A process for mounting the communication pad according to the prior art structured as above will be described below.

First, an upper end of the holder 30 is directed to an outside of the seating space 14. At this state, the communication pad 17 is inserted into the insertion groove 31 of the holder 30. Then, the clamp 20 pivots about the hinge 25 clockwise with respect to the figure. At this time, the torsion spring 29 gives the clamp 20 the elastic force counterclockwise with respect to the figure.

Then, by pivoting the communication pad 17 and holder 30 clockwise with respect to the figure, the upper end of the communication pad 17 is seated into the seating groove 21 of the clamp 20. At this state, if the external force applied to the clamp 20 is removed, the clamp 20 pivots by the elastic force counterclockwise with respect to the figure. Then, the upper front end of the communication pad 17 is supported by the supporting end 23.

However, the communication pad mounting structure according to the prior art having the above structure has a problem as follow.

When the conventional communication pad 17 is mounted at the front surface of the door 13, a mounting direction of the communication pad 17 cannot be adjusted. That is, the communication pad 17 is mounted so that the front surface thereof faces forward at the front surface of the door 13.

Therefore, for example, when the communication pad 17 is provided with a LCD screen, the user cannot look at the screen smoothly so far as the user is not positioned at the front surface of the door 13. It is the same as the communication pad 17 is provided with a television or radio. That is, since the user cannot adjust the direction of the communication pad 17 at his/her desire, there is a problem in that it is inconvenient to use the communication pad 17.

SUMMARY OF THE INVENTION

The present invention is conceived to solve the aforementioned problem in the prior art. Accordingly, an object of the present invention is to provide a communication pad mounting structure, which is structured so that an angle of a communication pad can be freely adjusted.

According to the communication pad mounting structure of the refrigerator of the present invention as described above, it is possible to tilt from side to side the communication pad, which is seated in the seating space of the refrigerator door according to a user's position. Therefore, since the user may use the communication pad by facing the front surface thereof to the user at diverse positions, user's convenience is improved.

DETAILED DESCRIPTION

Figure 1:
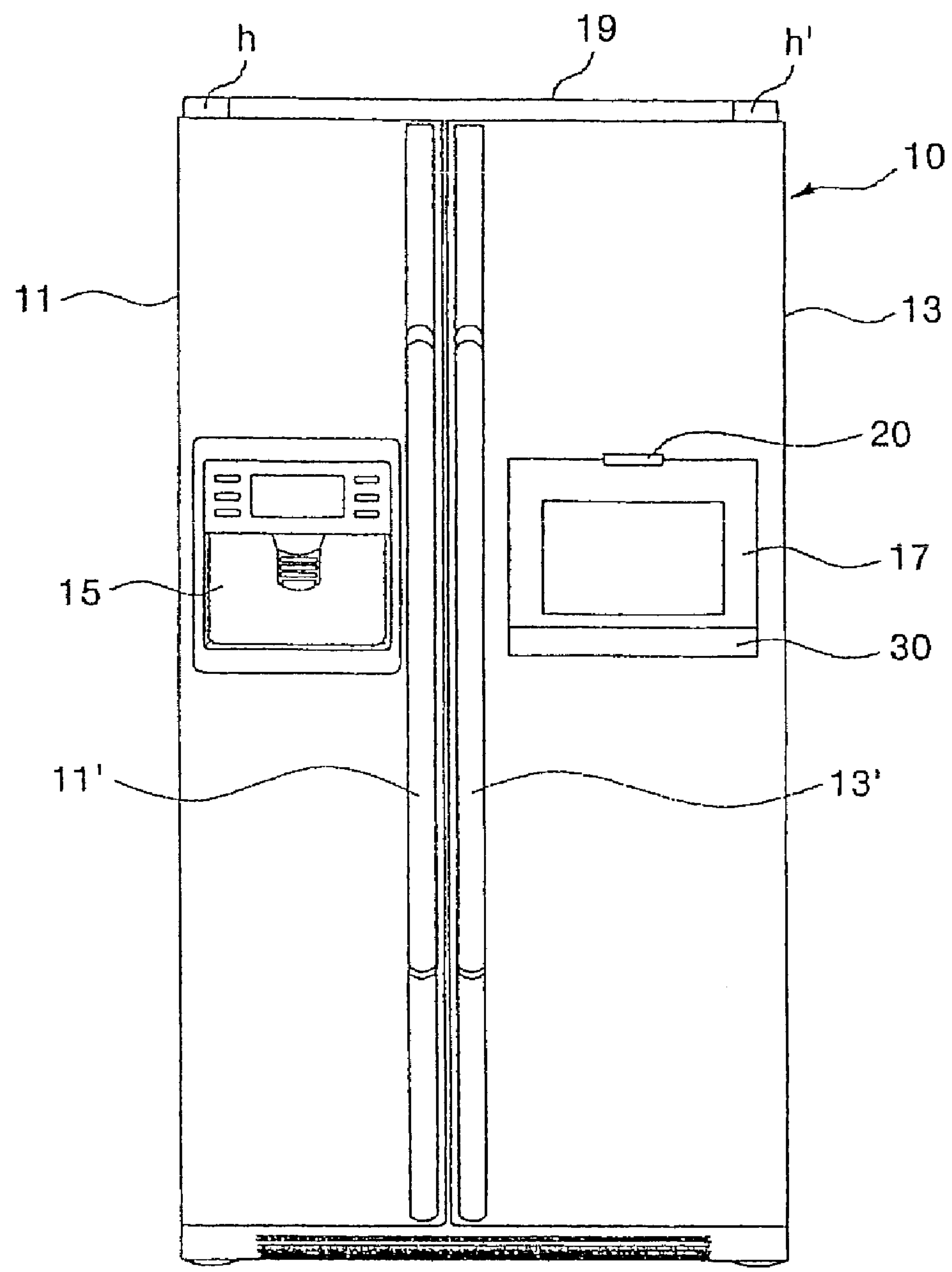
FIG. 1 is a front view of an appearance of a refrigerator according to a prior art.
Figure 2:
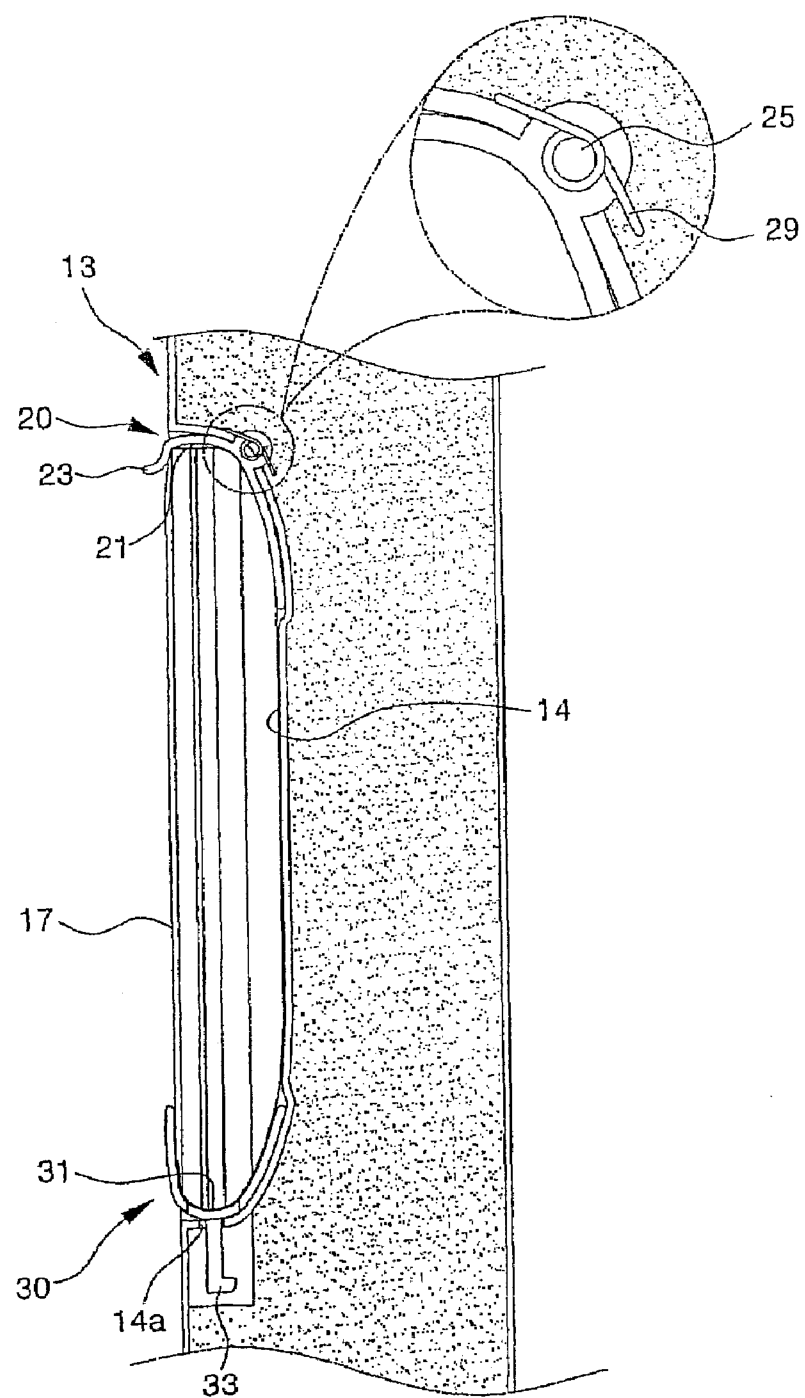
FIG. 2 is a side sectional view of a communication pad mounting structure according to a prior art.

According to an aspect of the present invention for achieving the object, there is provided a communication pad mounting structure of a refrigerator, comprising a seating space that is provided at a door for selectively opening and closing a storage space formed in a main body of the refrigerator such that a front face thereof is open; a communication pad detachably seated in the seating space, the communication pad inputting operational signals and displaying various information to the outside; a supporting means provided in the seating space, the supporting means supporting the communication pad; and a connecting means for pivotably connecting the supporting means in the seating space; whereby the communication pad can be selectively located at a position out of the seating space.

The supporting means may include a holder for supporting at least two surfaces of the communication pad in such a manner that the communication pad is mounted in the holder of which a front surface is partially opened so that the communication pad can be seen from the outside.

The connecting means may comprise a slot formed long at a side of the seating space; and a link portion for connecting the holder and the slot so that the holder can be tilted from side to side along the slot.

The link portion may comprise a pair of links, wherein an end of each of the links is connected to the slot in order to pivot and move along the slot, and the other end of each of the links is pivotably connected to a side of the holder.

The other ends of the links connected to the holder may be connected to each other pivotably about the same rotational shaft.

The links may be formed in a curved shape with the same radius of curvature.

According to another aspect of the present invention, a communication pad mounting structure of a refrigerator comprises a seating space formed at a surface of the refrigerator so that a front face of the seating space is opened; a communication pad detachably seated in the seating space, the communication pad providing signals at least from one side to the other side between the refrigerator and a user; a supporting means for supporting the communication pad so that at least a front surface of the communication pad is exposed to the outside; and a connecting means for pivotably connecting the supporting means in the seating space.

The supporting means may comprise a holder for supporting upper and lower ends of the communication pad, wherein a front surface of the holder is partially opened so that the communication pad is seen from the outside, and at least a side of the holder is opened so that the communication pad is slidably mounted.

The connecting means may comprise a pair of slots formed long from side to side at upper and lower ends of the seating space; and a pair of links, each of which has an end connected to the slot to pivot and move along the slot and the other end pivotably connected to a side of the holder, whereby the holder can be tilted from side to side along the slot.

The other ends of the links connected to the holder may be connected to each other pivotably about the same rotational shaft, and the links may be formed in a curved shape with the same radius of curvature.

According to the communication pad mounting structure of the refrigerator of the present invention as described above, there is an advantage in that a mounting position of the communication pad can be freely adjusted.

Referring to the accompanying drawings, a preferable embodiment of the present invention will be explained in detail.

Figure 3:
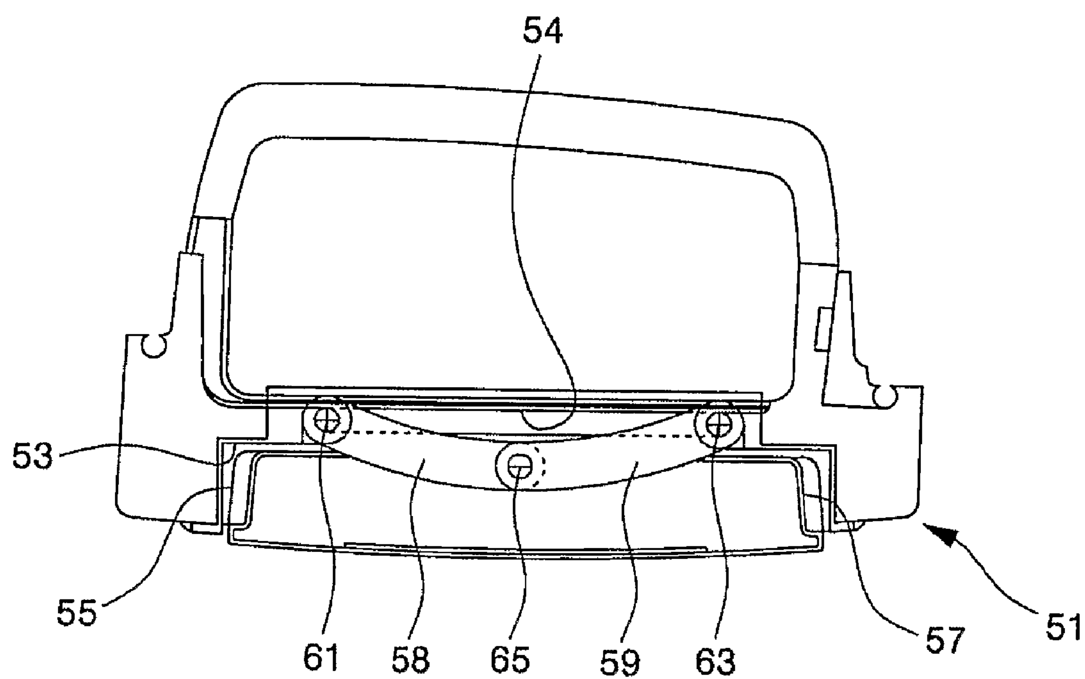
FIG. 3 is a transverse sectional view of a preferred embodiment of a communication pad mounting structure according to the present invention.
Figure 4:
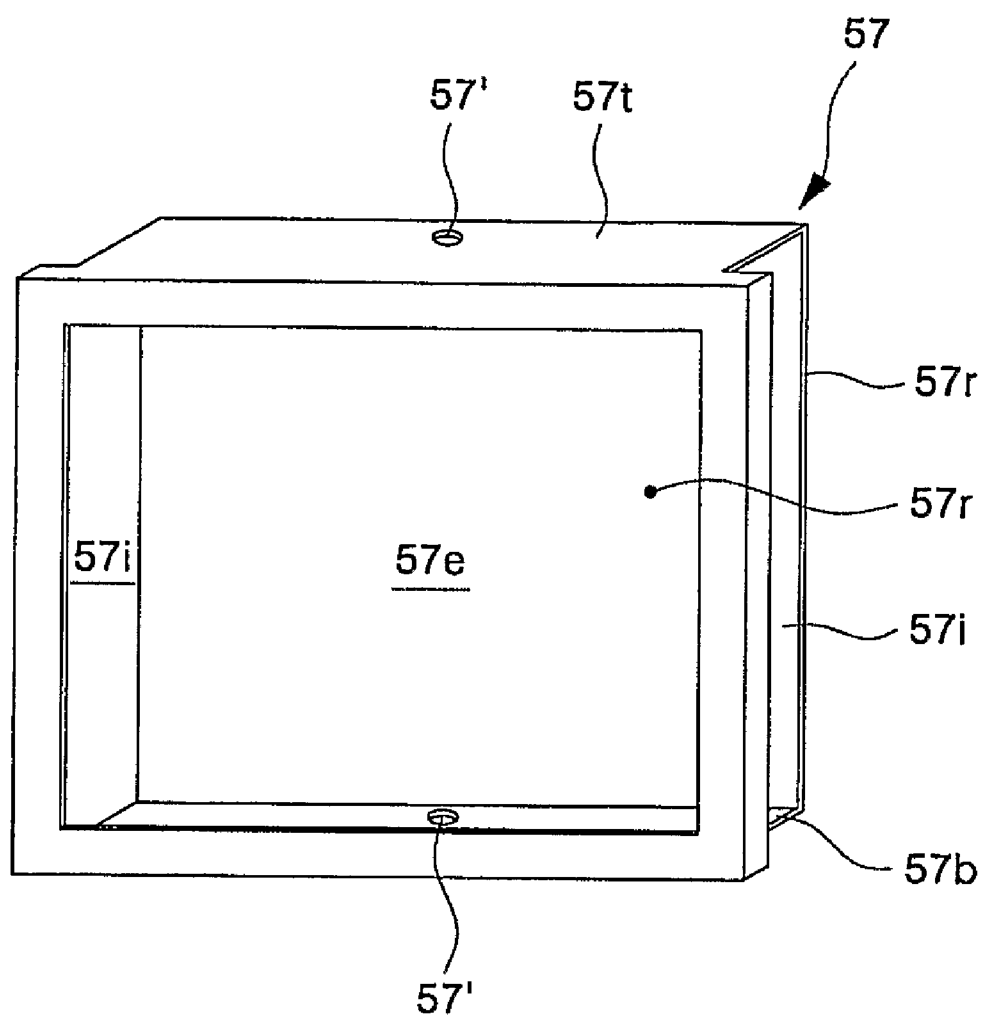
FIG. 4 is a schematic perspective view of an example of a holder employed in the present invention.

FIG. 3 is a view showing a preferred embodiment of a communication pad mounting structure of a refrigerator according to the present invention, and FIG. 4 is a schematic perspective view of an example of a holder employed in the present invention.

Referring to the figures, a predetermined seating space 53 is provided at a front surface of a door 51 for opening and closing a storage space in the refrigerator. The seating space 53, which is formed by depressing a portion of the front surface of the door 51, has a shape corresponding to an appearance of a communication pad 55. Upper and lower portions of the seating space 53 are formed with slots 54 elongated from side to side, respectively. The slots 54 are preferably formed at top and bottom of the seating space 53. However, the slots 54 may be formed on an inner surface of the seating space 53, that is, a surface seen from the front surface of the door 51.

The communication pad 55 is seated into the seating space 53. The communication pad 55 is provided with a tabulate computer including a touch screen for displaying various information about the Internet and an operation of the refrigerator and inputting operational signals and a controller for controlling the Internet and the refrigerator according to the inputted operational signals. Alternatively, the communication pad 55 for communication between a user and the refrigerator may be naturally provided with a separate household electrical appliance, such as a LCD screen, a television, a radio, an audio equipment.

The communication pad 55 is connected to a main body of the refrigerator by wire or wireless. It is the reason why signals for controlling an operation of the refrigerator itself in addition to signals for operating the communication pad 55 should be transferred through the communication pad 55.

The communication pad 55 is supported by a holder 57. The holder 57 functions to seat the communication pad 55 onto the door 51, more exactly, into the seating space 53. Therefore, any structures of the holder 57 may be possible if the holder 57 can support the communication pad 55.

The holder 57 may be structured so that at least two surfaces of the communication pad 55 with a substantially flat hexagonal shape can be supported. For example, the communication pad 55 is supported by the holder 57 which has a structure for supporting at least upper and lower, both side, or rear and lower surfaces of the communication pad 55. The holder 57 may comprise one or two parts. In addition, a front surface of the holder 57 must be opened so that the communication pad 55 can be seen from the outside.

Here, referring to FIG. 4, an example of the holder 57 will be described. An appearance of the holder 57 generally corresponds to that of the communication pad 55, wherein upper, lower, and rear surfaces are formed by upper, lower, and rear surface portions 57*t*, 57*b*, and 57*r*, respectively. The front surface of the holder 57 is formed with an opening 57*e*, so that the communication pad 55 installed in the holder 57 can be seen from the outside.

Both sides of the holder 57 are formed with inlets 57*i*, which allow the communication pad 55 to slidably enter the holder 57, respectively. One of the inlets 57*i* may be formed at any one side rather than both the sides of the holder 57. Holes 57' for a rotational shaft 65, which will be described below, are bored through the upper and lower surface portions 57*t* and 57*b*, respectively.

When another holder with alternative structure instead of the holder 57 shown in FIG. 4 is used, a structure for fixing the communication pad 55 to the holder 57 may be naturally diverse. The communication pad 55 may be caught and fixed or screwed to the holder 57.

Next, the holder 57 is installed tiltably from side to side in the seating space 53 by a pair of link portions. Each of the link portions for tilting the holder 57 consists of a pair of links 58 and 59, one ends of which are seated in the slots 54, and the other ends of which are pivotably connected to the holder 57.

At this time, the other ends of the links 58 and 59 are pivotably connected to the upper and lower surface portions 57*t* and 57*b* of the holder 57, respectively. That is, each of the links 58 and 59 is connected to the holder 57 to pivot about the rotational shaft 65 which is installed in the holes 57'. Thus, a pair of the links 58 and 59 are provided at each of upper and lower ends of the holder 57 so as to support the holder 57. For reference, it is preferred that the holder 57 or the links 58 and 59 should not be too easily rotated about the rotational shaft 65. Thus, it is preferred that the holder 57 or the links 58 and 59 can be rotated only if a force greater than a predetermined value is applied.

In the meantime, the ends of the links 58 and 59 that are seated in the slots 54 are provided with rollers 61 and 63, respectively. The rollers 61 and 63, which move along the slots 54, are installed at the slots 54 in order to be accidentally removed therefrom. The rollers 61 and 63 are rotatably installed at the links 58 and 59, and move and rotate in the slots 54. It is also preferred that the rollers 61 and 63 should not be too easily moved in the slots 54. That is, it is preferable that they are moved only if a force over a predetermined value is applied.

The links 58 and 59 are formed in a curved shape with a predetermined radius of curvature, wherein the centers of curvature thereof are adjacent to each other. That is, the links 58 and 59 are installed so that they are bulged toward the front surface of the door 51 when the communication pad 55 is seated in the seating space 53.

In the meantime, if the structure of the holder 57 is changed, a structure for connecting the links 58 and 59 to the holder 57 may also be changed. For example, if the links 58 and 59 are connected to the rear surface of the holder 57, a shape of the ends connected thereto should be changed.

Hereinafter, an operation of the communication pad mounting structure of the refrigerator according to the present invention having the structure as described above will be described in detail.

The communication pad 55 mounted to the holder 57 is seated in the seating space 53. To this end, the communication pad 55 is mounted to the holder 57. In case of the holder 57 shown in FIG. 4, the communication pad 55 is inserted therein through the inlet 57*i*. When the communication pad 55 is inserted and then mounted in the holder 57, a front surface of the communication pad 55 is exposed through the opening 57*e*.

In such a state, if the holder 57 is seated in the seating space 53, the rollers 61 and 63 provided at the ends of the links 58 and 59 are positioned at both ends of each slot 54, respectively. That is, each of the rollers 61 and 63 are positioned at both farmost positions in the slots 54. In addition, the links 58 and 59 are extended in substantially opposite directions with respect to the rotational shaft 57, respectively.

Next, referring to FIG. 5, an operation of the communication pad 55 tilted from side to side will be described. When the holder 57 in which the communication pad 55 is mounted as shown in FIG. 3 is pulled toward the front surface of the door 51, the rollers 61 and 63 of the links 58 and 59 move in the slots 54. That is, the rollers 61 and 63 move in the slots 54 so that they are adjacent to each other. Therefore, the holder 57 protrudes forwardly from the inside of the seating space 53.

Figure 5:
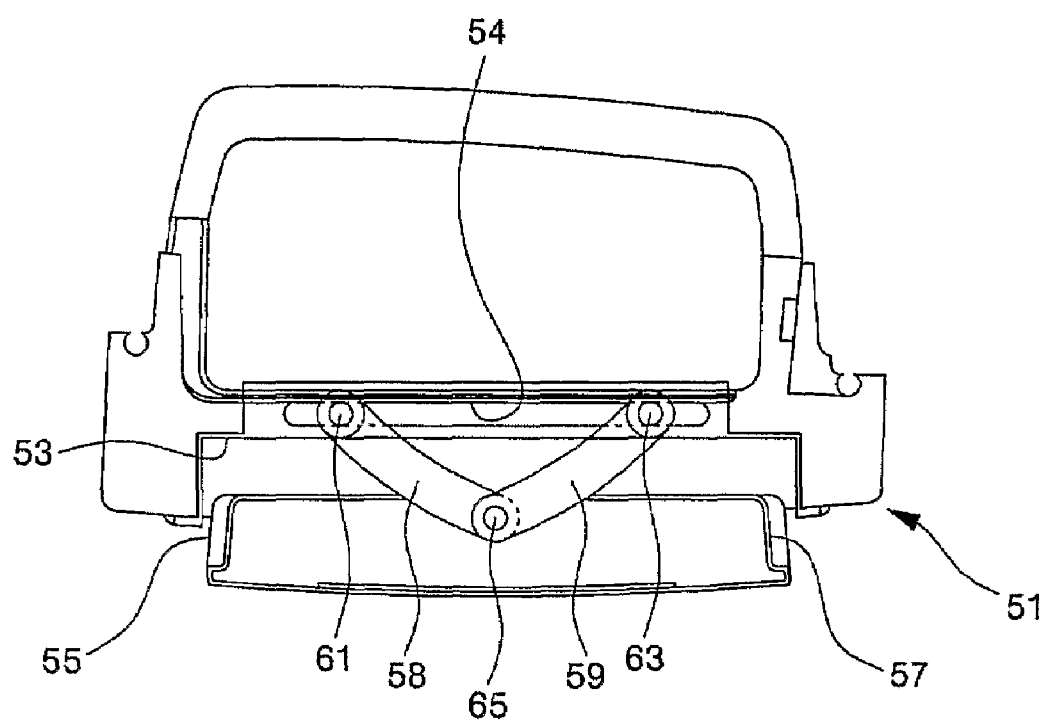
FIGS. 5 and 6 are views showing a tilting process of the embodiment shown in FIG. 3.

That is, as shown in FIG. 5, the roller 61 at the left side of the figure move to the right side of the figure, and therefore, the end of the link 58 connected thereto moves together with the roller 61 to the right side of the figure. The link 58 rotates clockwise with respect to the rotational shaft 57. In addition, the roller 63 at the right side of the figure move to the left side of the figure, and therefore, the end of the link 59 connected thereto moves together with the roller 63 to the right side of the figure. The link 59 rotates counterclockwise with respect to the rotational shaft 57.

Figure 6:
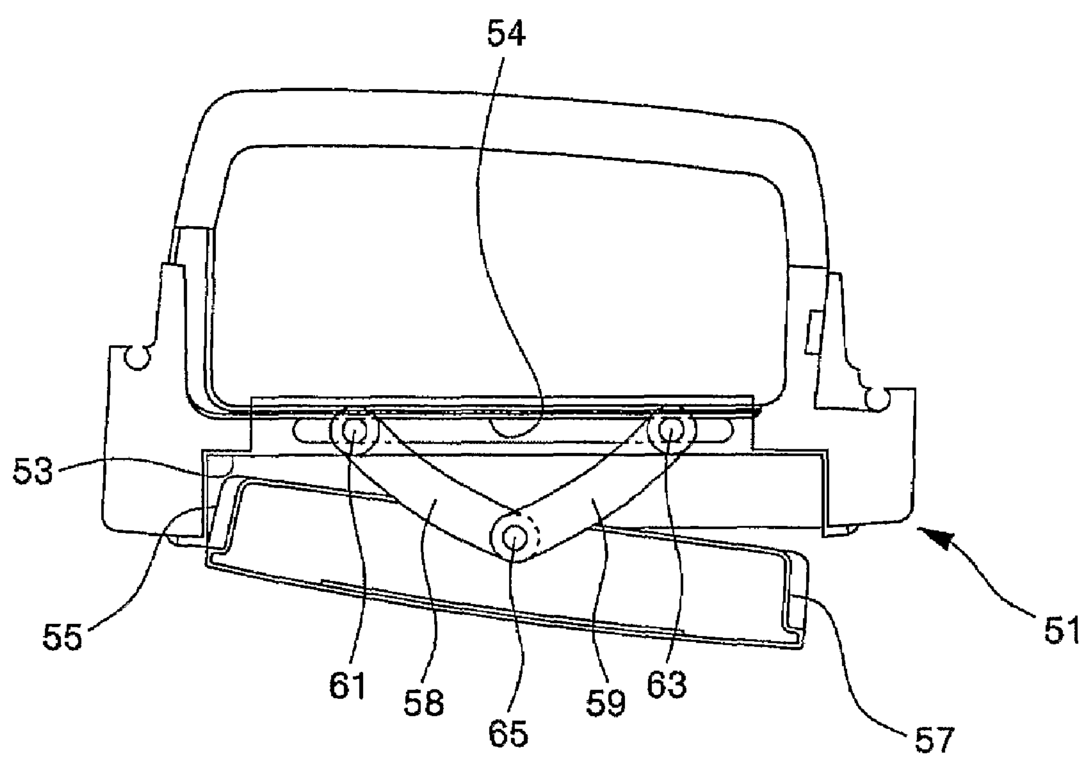

Next, FIG. 6 shows how the direction of the communication pad 55 is adjusted in a state where it protrudes slightly forward from the seating space 53.

In order to adjust the direction in which the front surface of the communication pad 55 faces, the holder 57 may be caused to pivot about the rotational shaft 57 clockwise or counterclockwise as viewed from FIG. 6.

A tilting angle of the communication pad 55 may be determined according to a position of the user with respect to the front surface of the door 51. Thus, the user allows the front surface of the communication pad 55 to face himself/herself at various positions by tilting the communication pad 55.

It will be natural that those skilled in the art make various modifications thereto within the scope of the technical spirit of the invention. The true scope of the present invention should be defined on the basis of the appended claims.

For example, various modification of the holder 57 may be employed to the extent that the communication pad 55 can be supported in the seating space 53.

Furthermore, the structure of the links 58 and 59 capable of moving the holder 57 in or out of the seating space 53 and changing the installation angle of the communication pad 55 and the connection structure between the links 58 and 59 and the holder 57 may be diversely modified.

The invention claimed is:

1. A communication pad mounting structure of a refrigerator, comprising:

a seating space provided at a door for selectively opening and closing a storage space formed in a main body of the refrigerator such that a front face thereof is open;

a communication pad detachably seated in the seating space, the communication pad inputting operational signals and displaying a variety of information;

a supporter, provided in the seating space, for supporting the communication pad; and a connector for pivotably connecting the supporter in the seating space, the connector adjusting to allow the communication pad to move between extended and retracted positions relative to the seating space, wherein:

the connector is coupled to the supporter to allow the communication pad to rotate throughout a predetermined range of angles while in the extended position, a front surface of the communication pad is located entirely out of the seating space in the extended position, the connector comprises a slot of a predetermined length formed along a surface of the seating space, and a link portion for connecting the supporter to the slot so that the supporter rotates relative to the slot, the link portion comprises a pair of links, wherein an end of each of the links is connected to the slot in order to pivot and move along the slot and another end of each of the links is pivotably connected to a side of the supporter, and the other ends of the links connected to the supporter are connected pivotably about a same rotational shaft.

2. The mounting structure as claimed in claim 1, wherein the supporter includes a holder for supporting at least two surfaces of the communication pad in such a manner that the communication pad is mounted in the holder of which the front surface is partially opened so that the communication pad can be seen from the outside.

3. The mounting structure as claimed in claim 1, wherein the links are formed in a curved shape with a same radius of curvature.

4. A communication pad mounting structure of a refrigerator, comprising:

a seating space formed at a surface of the refrigerator so that a front of the seating space is opened;

a communication pad detachably seated in the seating space and providing signals for the refrigerator;

a supporter for supporting the communication pad so that at least a front surface of the communication pad is exposed; and a connector for pivotably connecting the supporter in the seating space, wherein the connector moves within at least one slot that is at least substantially parallel to the front surface of the communication pad, to allow the communication pad to rotate throughout a predetermined range of angles, the at least one slot formed in a back surface of the seating space and wherein a front surface of the communication pad is located entirely out of the seating space during rotation, wherein the connector comprises a link portion for connecting the supporter to the slot so that the supporter rotates relative to the slot, the link portion comprises a pair of links, wherein an end of each of the links is connected to the slot in order to pivot and move along the slot and another end of each of the links is pivotably connected to a side of the supporter, and the other ends of the links connected to the supporter are connected pivotably about a same rotational shaft.

5. The mounting structure as claimed in claim 4, wherein the supporter comprises:

a holder for supporting upper and lower surfaces of the communication pad, wherein a front portion of the holder is at least partially opened to allow the communication pad to be visible from a predetermined location relative to the refrigerator, and wherein at least one side of the holder is opened to allow the communication pad to movably mounted relative to the seating space.

6. The mounting structure as claimed in claim 5, wherein a pair of slots is formed along opposing surfaces of the seating space; wherein two pairs of links are coupled to respective ones of the slots, and wherein the link in each pair has an end connected to a respective one of the slots to pivot and move along the slot and another end pivotably connected to a respective side of the holder.

7. The mounting structure as claimed in claim 6, wherein the other ends of each pair of the links connected to the holder are connected pivotably about a same rotational shaft, and the links are formed in a curved shape with a same radius of curvature.

8. The mounting structure as claimed in claim 1, wherein the front surface of the communicated pad is located entirely out of the seating space in both the extended and retracted positions.

9. The mounting structure as claimed in claim 1, wherein the connector includes at first and second reciprocating members which move in opposite directions to allow the communication pad to move between the extended and retracted positions.

10. The mounting structure as claimed in claim 9, further comprising: a slot formed at least substantially parallel to the front surface of the communication pad when the communication pad is in the retracted position, wherein the slot is formed along a recessed surface of the seating space and wherein first ends of the first and second reciprocating members move in opposite directions along said slot to allow the communication pad to move between the extended and retracted positions.

11. A communication pad mounting structure, comprising:

a seating space provided at a door for selectively opening and closing a storage space formed in a main body of the refrigerator such that a front face thereof is open;

a communication pad detachably seated in the seating space, the communication pad inputting operational signals and displaying a variety of information;

a supporter, provided in the seating space, for supporting the communication pad; and a connector for pivotably connecting the supporter in the seating space, the connector adjusting to allow the communication pad to move between extended and retracted positions relative to the seating space, wherein:

the connector is coupled to the supporter to allow the communication pad to rotate throughout a predetermined range of angles while in the extended position, a front surface of the communication pad is located entirely out of the seating space in the extended position, the connector includes at first and second reciprocating members which move in opposite directions to allow the communication pad to move between the extended and retracted positions, a slot is formed at least substantially parallel to the front surface of the communication pad when the communication pad is in the retracted position, wherein the slot is formed along a recessed surface of the seating space and wherein first ends of the first and second reciprocating members move in opposite directions along said slot to allow the communication pad to move between the extended and retracted positions, and the first ends of the first and second reciprocating members are respectively coupled to first and second rollers that move within the slot in opposite directions to allow the communication pad to move between the extended and retracted positions.

12. The mounting structure as claimed in claim 11, wherein second ends of the first and second reciprocating members are pivotally coupled to a same location on the supporter.

13. The mounting structure as claimed in claim 12, wherein said same location is substantially at a center of one surface of the holder, the second ends of the first and second reciprocating members being pivotally connected to the supporter at said center.

14. The mounting structure as claimed in claim 13, wherein the first and second reciprocating members have substantially a same radius of curvature, each of said members having a concave curvature relative to a back surface of the supporter.

15. A communication pad mounting structure, comprising:

a seating space provided at a door for selectively opening and closing a storage space formed in a main body of the refrigerator such that a front face thereof is open;

a communication pad detachably seated in the seating space, the communication pad inputting operational signals and displaying a variety of information;

a supporter, provided in the seating space, for supporting the communication pad; and a connector for pivotably connecting the supporter in the seating space, the connector adjusting to allow the communication pad to move between extended and retracted positions relative to the seating space, wherein:

the connector is coupled to the supporter to allow the communication pad to rotate throughout a predetermined range of angles while in the extended position, a front surface of the communication pad is located entirely out of the seating space in the extended position, the connector includes at first and second reciprocating members which move in opposite directions to allow the communication pad to move between the extended and retracted positions, a slot is formed at least substantially parallel to the front surface of the communication pad when the communication pad is in the retracted position, wherein the slot is formed along a recessed surface of the seating space and wherein first ends of the first and second reciprocating members move in opposite directions along said slot to allow the communication pad to move between the extended and retracted positions, and a length of the slot is smaller than a corresponding length of a back surface of the supporter.

16. The mounting structure as claimed in claim 1, wherein the communication pad includes a wireless communication unit that communicates wirelessly with the refrigerator.

17. The mounting structure as claimed in claim 1, wherein two connectors support the supporter at opposing surfaces of the supporter, to allow the communication pad to move between the extended and retracted positions.

* * * * *